United States Patent
Bohannon et al.

(10) Patent No.: US 11,868,385 B2
(45) Date of Patent: Jan. 9, 2024

(54) CLASSIFICATION AND COMPARISON OF EVENT RELATED

(71) Applicant: Primer Technologies, Inc., San Francisco, CA (US)

(72) Inventors: John Neil Bohannon, San Francisco, CA (US); Leonard Apeltsin, Berkeley, CA (US); Raine Morgan Hoover, San Francisco, CA (US); Wei Gong, San Francisco, CA (US)

(73) Assignee: Primer Technologies, Inc., San Francisco, CA (US)

( * ) Notice: Subject to any disclaimer, the term of this patent is extended or adjusted under 35 U.S.C. 154(b) by 519 days.

(21) Appl. No.: 16/387,362

(22) Filed: Apr. 17, 2019

(65) Prior Publication Data

US 2019/0318199 A1 Oct. 17, 2019

Related U.S. Application Data

(60) Provisional application No. 62/658,767, filed on Apr. 17, 2018.

(51) Int. Cl.

| | | |
|---|---|---|
| *G06F 16/34* | (2019.01) | |
| *G06F 9/54* | (2006.01) | |
| *G06F 16/9038* | (2019.01) | |
| *G06F 18/2115* | (2023.01) | |
| *G06F 18/22* | (2023.01) | |
| *G06F 18/2431* | (2023.01) | |
| *G06V 10/70* | (2022.01) | |
| *G06V 10/764* | (2022.01) | |
| *G06V 10/80* | (2022.01) | |
| *G06V 20/40* | (2022.01) | |

(52) U.S. Cl.
CPC ............ *G06F 16/345* (2019.01); *G06F 9/542* (2013.01); *G06F 16/9038* (2019.01); *G06F 18/2115* (2023.01); *G06F 18/22* (2023.01); *G06F 18/2431* (2023.01); *G06V 10/70* (2022.01); *G06V 10/764* (2022.01); *G06V 10/811* (2022.01); *G06V 20/41* (2022.01)

(58) Field of Classification Search
USPC .......................................................... 709/203
See application file for complete search history.

(56) References Cited

U.S. PATENT DOCUMENTS

| | | | | |
|---|---|---|---|---|
| 2008/0010304 A1* | 1/2008 | Vempala | ............... | G06F 16/355 |
| 2012/0135745 A1* | 5/2012 | Kaplan | ................... | G06F 16/29 |
| | | | | 455/456.1 |
| 2014/0222821 A1* | 8/2014 | Kelmenson | ............... | G06F 7/08 |
| | | | | 707/740 |
| 2016/0171542 A1* | 6/2016 | Fanous | .............. | G06Q 30/0269 |
| | | | | 705/14.54 |
| 2016/0283462 A1* | 9/2016 | Gallé | ..................... | G06Q 50/01 |

\* cited by examiner

*Primary Examiner* — Hermon Asres

(57) ABSTRACT

Systems, methods, and software described herein provide enhancements of managing summaries provided to end users. In one implementation, a summary service identifies data objects that correspond to an event and classifies each of the data objects into classifications of interest. Once classified, data objects are compared between the different classifications to identify information differences, and the information differences are used to generate a summary for an end user of the summary service.

18 Claims, 7 Drawing Sheets

| DATA OBJECT 510 | FIRST CLASSIFICATION TYPE 512 | SECOND CLASSIFICATION TYPE 513 | THIRD CLASSIFICATION TYPE 514 |
|---|---|---|---|
| OBJECT 520 | CLASSIFICATION 530 | CLASSIFICATION 540 | CLASSIFICATION 550 |
| OBJECT 521 | CLASSIFICATION 531 | CLASSIFICATION 541 | CLASSIFICATION 551 |
| OBJECT 522 | CLASSIFICATION 532 | CLASSIFICATION 540 | CLASSIFICATION 551 |
| OBJECT 523 | CLASSIFICATION 531 | CLASSIFICATION 541 | CLASSIFICATION 551 |

DATA STRUCTURE 500

FIGURE 5

CLASSIFICATION AND COMPARISON OF EVENT RELATED

RELATED APPLICATIONS

This application hereby claims the benefit of and priority to U.S. Provisional Patent Application No. 62/658,767, titled "CLASSIFICATION AND COMPARISON OF EVENT RELATED DATA OBJECTS," filed Apr. 17, 2018, and which is hereby incorporated by reference in its entirety.

BACKGROUND

News sources often generate images, articles, graphs, and other similar objects that are used in providing information about a particular event. These events may include financial events, world news events, local news events, among other possible events. The objects generated may include various facts, relevant images, or other similar data that can be used in providing a reader or viewer with information about the particular event. However, although news stories may provide information about a particular event, different news stories may provide different information, and may even provide false information. As a result, readers and viewers of the objects may find it difficult to identify important information within the objects, as well determine the information that is factually correct.

OVERVIEW

Provided herein are enhancements for managing and providing event summaries to end users. In one implementation, a summary service is configured to identify data objects that qualify for an event from a plurality of data objects obtained from a plurality of information sources and identify two or more classifications of interest for the event. The summary service is further configured to, for each data object in the data objects that qualify for the event, determining whether the data object qualifies for a classification of interest of the two or more classifications of interest, and when the data object qualifies for a classification of interest, classifying the data object as part of the classification of interest. The summary service is also configured to determine information differences between data objects in different classifications of the two or more classifications, and generate a summary based on the information differences.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

FIG. 5 illustrates a data structure for managing classifications of data objects according to an implementation.

DETAILED DESCRIPTION

Figure 1:
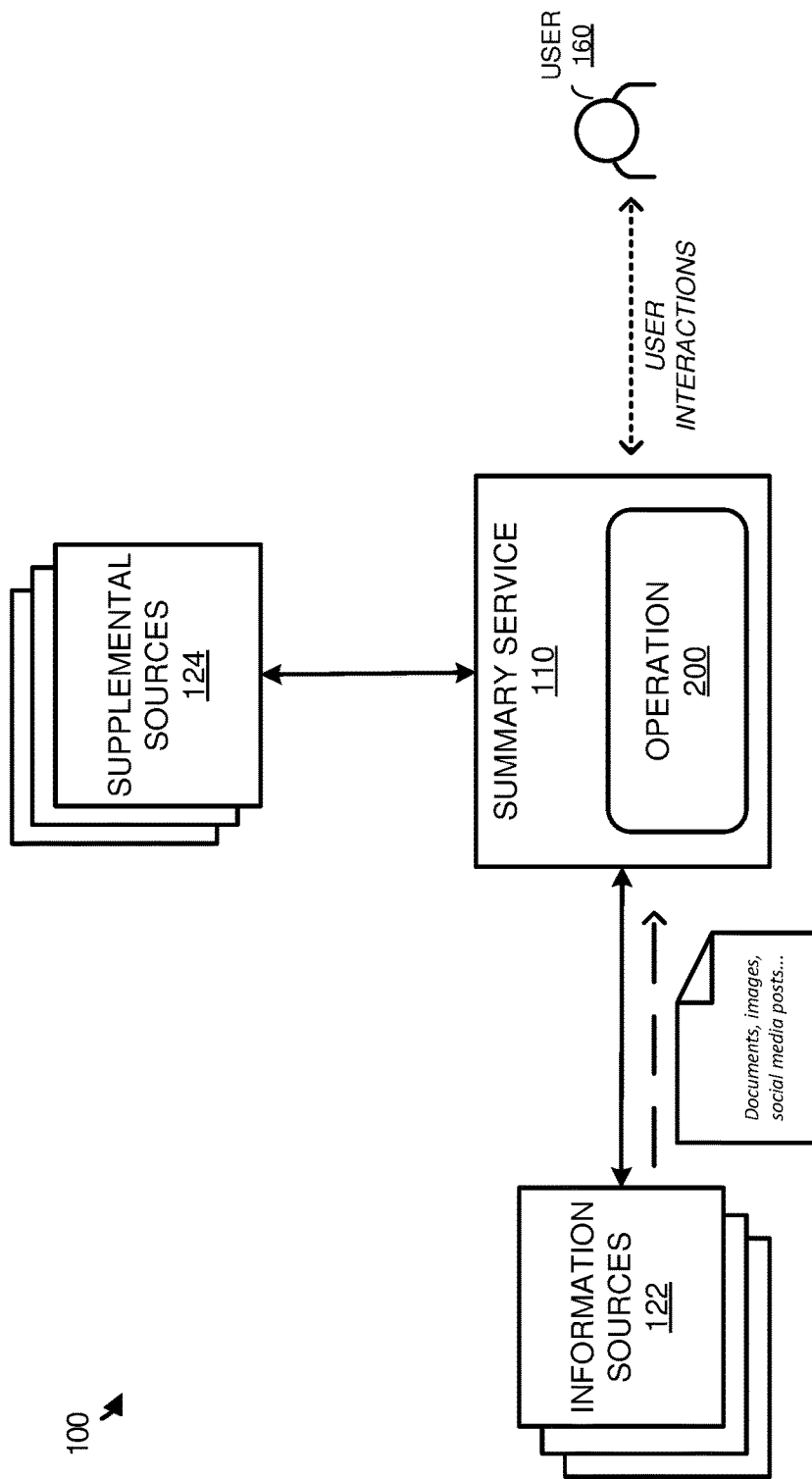
FIG. 1 illustrates a computing environment for multi-source event summarization according to an implementation.

FIG. 1 illustrates a computing environment 100 for multi-source event summarization according to an implementation. Computing environment 100 includes information sources 122, summary service 110, supplemental sources 124, and user 150. Summary service 110 communicates with information sources 122 and supplemental sources 124 via various communication links and implements event operation 200 using objects received from sources 122 and 124. Operation 200 is further described with reference to FIG. 2.

In operation, information sources 122 generate data objects, such as text news stories, documents, social media posts, images, graphs, and other similar objects to provide information about various topics. For example, an information source in information sources 122 may generate a news article for a death of a diplomatic leader. As the objects are generated, the objects are obtained by summary service 110, wherein summary service 110 executes event operation 200 to provide event summaries based on the information provided by the information sources. In particular, to generate the summaries, summary service 110 may identify events based on the objects received and classify the events, such that information about the events may be provided to a user of summary service 110.

In some implementations, in providing the summaries to user 160, summary service 110 may be used to determine how the summaries are provided to the requesting user. For example, summary service 110 may include various methods of displaying information for each of the events. These methods may include providing a text based summary of an event (e.g. a paragraph or more of text derived from the objects that were used in identifying the event), providing a graph for information related to when the objects were created, summaries of quotes related to an event, summaries that identify and summarize key numbers within objects related to an event, or some other similar summary type for an event. In at least one implementation, summary service 110 may be configured to classify data objects for an event into different classifications, wherein the classifications may be based on the source (e.g. website) of the object, a language used in the object, a geographic source of the object, or some other similar classification. For example, classifications for data objects related to event may be determined based on whether the objects were generated in Asia or in North America. Once categorized, summary service 110 may process the objects to provide data of interest to user 160.

Figure 2:
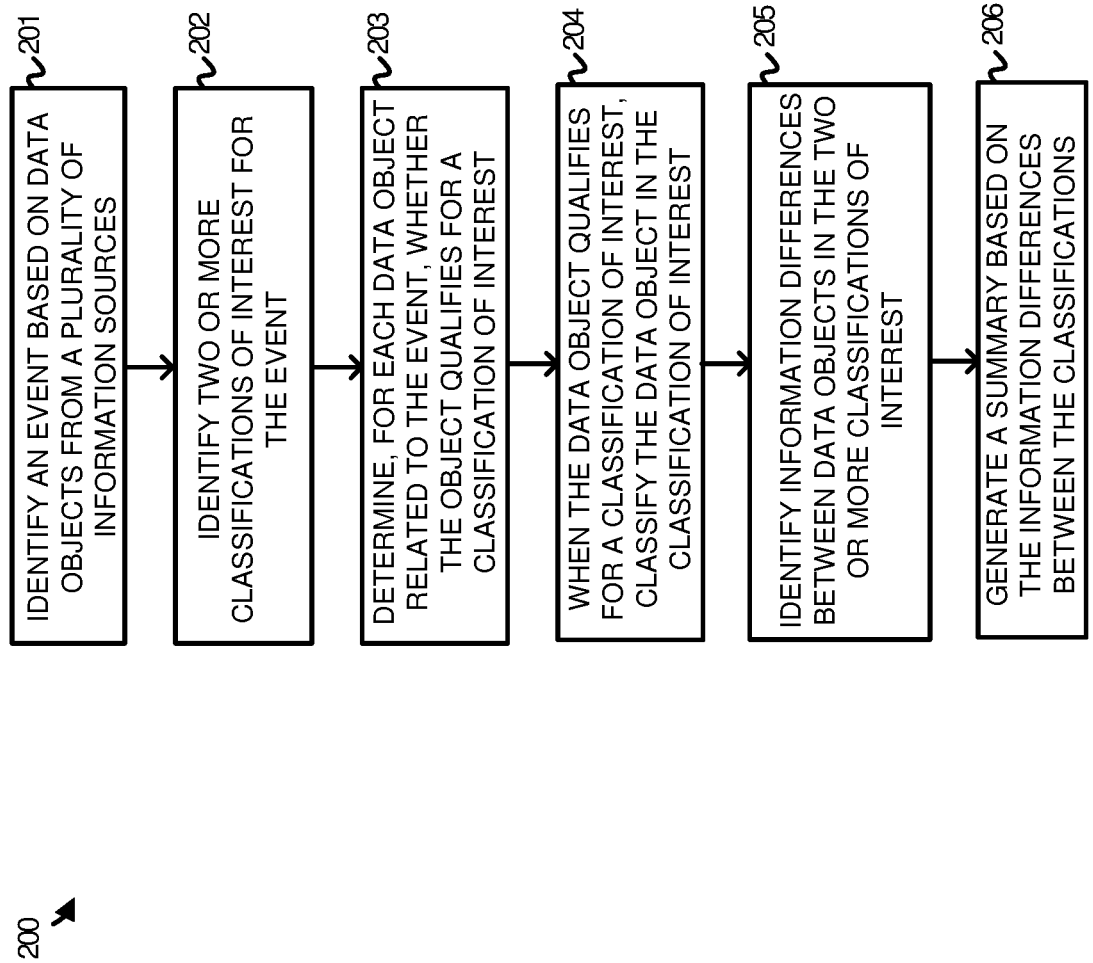
FIG. 2 illustrates an operation of a summary service for providing multi-source event summarization according to an implementation.

To further demonstrate the operations of summary service 110, FIG. 2 is provided. FIG. 2 illustrates an operation 200 of a computing system for providing multi-source event summarization according to an implementation. Operation 200 is described parenthetically in the paragraphs that follow with reference to systems and elements of computing environment 100 of FIG. 1.

As described previously, summary service 110 receives data objects from information sources 122 to identify events, such as political events, sporting news events, popular culture events, births, deaths, marriages, corporate events (e.g., initial public offerings, bankruptcies, mergers, stock price changes, product and service introductions, law suits and personnel changes), legal events and proceedings, community events, and military events and actions. Events may further include entities in some examples, such as individuals, groups, or organizations, and may further comprise locations, such as cities, regions, and the like. The events may have occurred in the past, may be ongoing, or could be events that are in the future. In identifying the events, objects are obtained from sources 122, wherein the sources may comprise feeds, webpages, databases, and the like. Once the objects are obtained, information (or data points) from the objects is extracted and used in determining whether an event should be identified. This may include similarities between content in multiple objects, the period for which the content was identified, the source or sources of the objects, or some other similar information. Once an event is identified, the objects identified from information source 122 may be used in generating summaries for the event. Additionally, in some examples, such as that depicted in computing environment 100 of FIG. 1, summary service 110 may use the information from supplemental sources 124 in generating the summary. These supplemental sources may comprise databases, resource webpages, or some other similar resource that can be used to provide background and/or support information for the event. For example, if a person is identified within a plurality of internet articles that form the basis of an event, supplemental sources 124 may be used to retrieve additional information about the person of interest. This information, which may be retrieved as an object for the event, may then be used in generating summaries of the event for a requesting user.

In the present implementation, in generating a summary for user 160, operation 200 identifies (201) an event based on data objects from a plurality of data or information sources. Once an event is identified, summary service 110 may identify (202) two or more classifications of interest for the event. These classifications may comprise languages of interest, geographic regions of interest, information sources of interest, or the like. For example, a classification type may be used to classify data objects based on the source of the data object, wherein objects from conservative source may be classified within a first classification of interest, and objects from a liberal source may be classified within a second classification of interest. In some implementations, the classifications of interest may be applied to all events that are identified by the summary service, however, it should be understood that the classifications may be specific to the event and can be identified via user selection or based on the type of event (economic, sports, and the like).

After the classifications of interest are identified for the event, summary service 100 determines (203), for each data object that qualifies for the event, whether the object qualifies for a classification of interest and, when the data object qualifies for a classification of interest, associates or classifies (204) the data object with the classification of interest. Returning to the example of the conservative and liberal classifications, summary service 110 will inspect each of the objects based on their source and classify the objects based on the source. In some implementations, in classifying the data objects, summary service 110 may be capable of identifying when a data object fails to qualify for any of the classifications of interest and may prevent the data object from being associated with a classification of interest. Thus, only relevant objects to the classifications of interest will be identified for the classifications.

Once the data objects are associated with the appropriate classifications, summary service 110 will identify (205) information differences between data objects classified in different classifications of the two or more classifications. Again, returning to the example of liberal and conservative source classifications, data objects that are classified in the conservative classification may be compared to data objects that are classified in the liberal classification. This may include comparisons between numerical values, comparisons between terms or units associated with the numerical values (e.g. "people" instead of "citizens"), differences in opinion of the data objects between the categories (which may be extracted using natural language processing), and the like. In some examples, in identifying the data for which to compare between data objects, the summary service may employ natural language processing to identify the relevant data for comparison. As an example, text from a first object may read "the new product will be launched April 7," while text for a second object may read "a release date is set for April 8 for the new product." The summary service may identify the relevant trait for each of the objects, in this example the release date, and compare the trait with other objects to determine if there is an information difference.

After the information differences are determined between the categories of interest, operation 200 will generate (206) a summary based on the information differences. In some implementations when the summary is generated, the summary may identify data differences with the largest discrepancy, such as the largest numerical value discrepancy, may identify differences in data most relevant to the event, such as a monetary value in a transaction or a date of release for a particular product, or may identify any other similar difference. In some examples, in addition to or in place of identifying differences in the data between the classifications, summary service 110 may identify similarities that are shared between data objects across the different categories. These similarities may include similarities in numerical values, similarities in the units used for the values, similarities in focus between the data objects, or some other similar similarity determination. For example, when processed by summary service 110, summary service 110 may determine that the values and units across the classifications are similar and may provide these similarities in a summary for the end user. This summary may be provided as a list, as natural language generated text, graphically, or any other similar manner.

In some implementations, to generate a summary, the summary may first be requested by a user of summary service 110. In response to the request, summary service may generate the summary as required for the user. This summary may be based on the identified information differences between the classifications and may further be based on preferences associated with the requesting user. These preferences may be expressly defined by the user or may be learned through interactions of the user with summary service 110. For example, summary service 110 may identify data of interest for the user based on previous summary requests of the user. This may include monitoring the user's interactions with the service to identify types of data that are more relevant to the user, such as interests in monetary values over names of persons. Accordingly, when a summary is generated for the user, the summary may promote numerical value differences identified between the categories of interest over any other data items of interest within the categories. The data differences may be presented as a list, as a narrative, as one or more graphs, or some other similar demonstration to provide the user with a summary of the differences between data in different classifications.

In some examples, when information differences are identified between objects of different classifications, each of the information differences may be scored based on a variety of factors. These factors may include the disparity between the data in a first classification to data in the second classification (e.g. difference in monetary value, year, and the like), the relevance to the event type for the event (e.g. sporting event, product release, initial public offer, and the like), the relevance to the user based on user preferences, or some other similar factor. Once the scores are determined, the scores may be used in generating the summary that is provided to the requesting user. In some implementations, the score may be used in defining which of the information differences are provided to the end user. In particular, any information difference of the information differences that meets a score criteria may be provided to the user, whereas any information difference of the information differences that do not meet the score criteria may not be provided to the end user. Additionally, in generating the summary, the information differences may be prioritized, such that higher or better scores are promoted (placed higher on a list, placed earlier in a text summary, and the like) for presentation to the end user.

Figure 3:
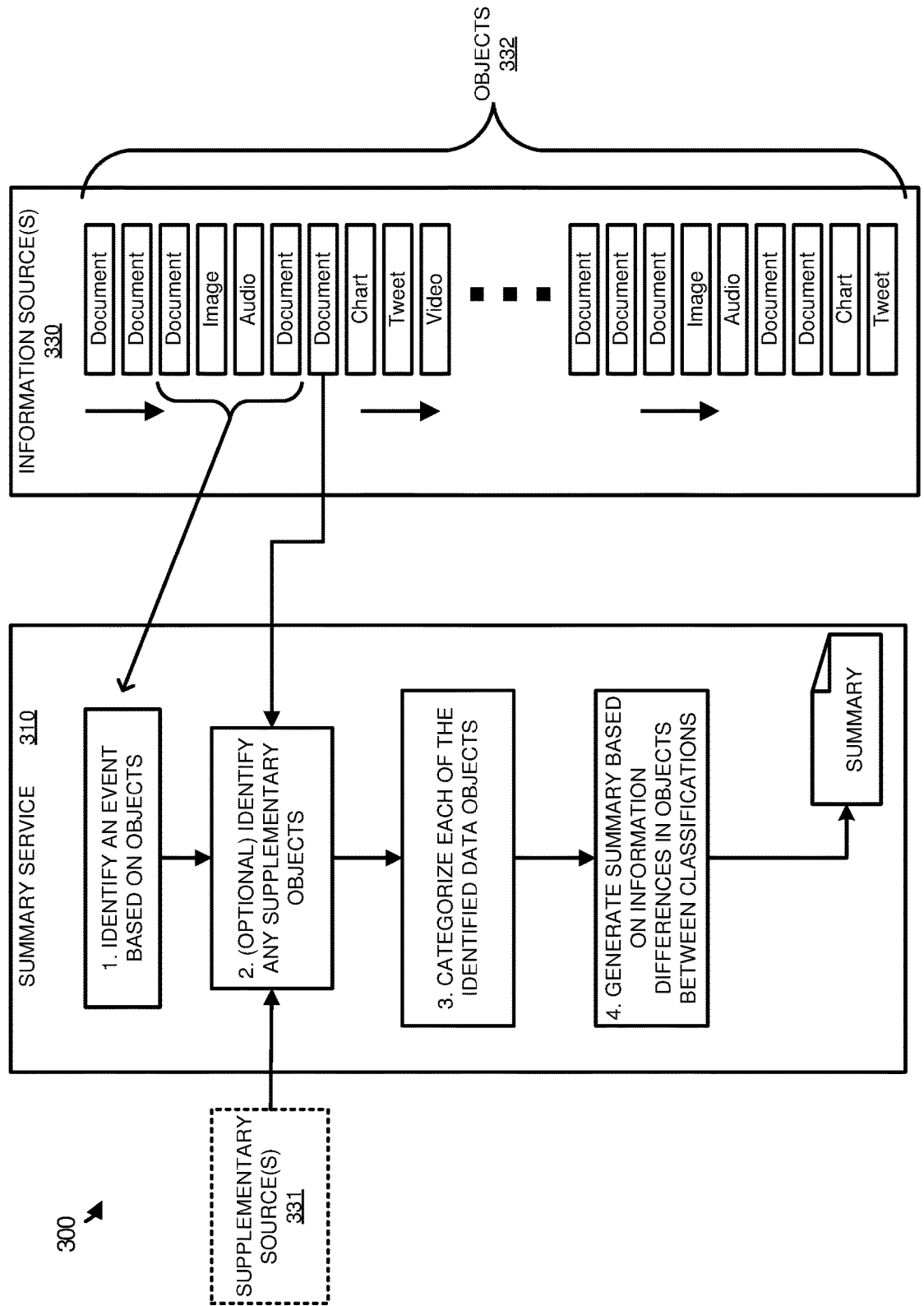
FIG. 3 illustrates an environment to generate event summaries according to an implementation.

FIG. 3 illustrates an environment 300 to generate event summaries according to an implementation. Environment 300 includes summary service 310, information sources 330, and supplementary sources 331. Sources 330-331 may comprise databases and/or websites capable of generating data objects, such as articles, images, videos, social media posts, or some other similar type of data object.

As depicted, at step 1, summary service 310 identifies an event based on objects from information sources 330. In identifying the event, summary service 310 may obtain the objects from sources 330, wherein sources 330 may comprise news media outlets, technology blogs, social media networks, or some other similar source. While the objects are obtained, summary service 310 will identify traits within the object and the relationship of the traits with other objects to determine whether the object corresponds to an event. For example, summary service 310 may identify dates, numbers, persons of interest, or some other similar data point within a data object and determine whether the object applies to a previously identified event or qualifies for a new event. Using the example of FIG. 3, two documents, an image, and an audio file are identified as corresponding to a particular event based on the data within the objects, the time that the objects were identified, or any other similar information. After an event is identified, summary service 310 may further, in some implementations, identify any relevant supplementary objects that can be derived from information sources 330 and or supplementary sources 331 at step 2. These sources may provide background information for a particular person or date, provide context for a particular event, or may provide any other supplementary information about the event.

Once an event is identified, summary service 310 categorizes or classifies, at step 3, the data objects that qualify for the event into different categories of interest. In particular, summary service 310 will identify classifications of interest for the event. In some implementations, the classification of interest will be the same for all events, however, it should be understood that the classifications of interest may be specific to each event and identified based on user specification for the event or may be based on the type of event (e.g. release date, financial event, sport event, political event, and the like). After identifying the categories of interest, summary service 310 will, for each data object that qualifies for the event, determine whether the data object meets criteria to be classified into one of the classifications. If the data object qualifies for a particular classification, the data object may be associated with, or classified into, the particular classification. In some implementations, a data object may not qualify for any of the classifications of interest. In such an implementation, the data object may not be used in the comparison desired by the user. For example, if the user requested that data objects be classified into two language categories, wherein one category was for English and the other for Spanish. Any of the data objects that qualify for one of the languages may be associated with the corresponding language, while any objects that do not qualify for the languages may not be associated with any language and, instead, may be associated with a "NULL" category in some implementations. Accordingly, any objects that did not qualify for one of the languages of interest may not be used in the comparison.

After the objects are classified, summary service 310 further generates, at step 4, a summary based on information differences in objects between the categories of interest. This summary may be written in the form of prose (natural language generated text), may be a graph, may list of data items of interest, or may be provided in any other similar manner. For example, returning to the example of Spanish and English categories, the summary may demonstrate differences, as well as similarities between the data items that were classified in each of the language categories. In some implementations, in generating the summary, summary service 310 may inspect each of the data items to identify information of interest within the data objects (numbers and associated units, names, locations, and the like). Once the information of interest is identified, the information may be compared with information that was extracted from one or more of the data objects that were classified for another group. Thus, if data objects for a first classification stated that there were ten protestors for an event, while data objects for a second classification stated that there were one-hundred protestors, then summary service 310 may generate a summary that indicates the discrepancy between the values. In some implementations, in identifying the differences, summary service 310 may average or summarize each of the classifications prior to comparing. For instance, using the protestor examples, the average, median, mode, or some other summarization quantity of protestors for each of the languages may be compared between the classifications. In other implementations, each of the data objects may be compared individually, however, it should be understood that any other similar method of comparison may be used in generating a summary.

In some examples, in generating the summary, only data points or values that meet particular criteria may be identified for the summary. These data points may be selected based on the size discrepancy (e.g. large value differences) between data values in each of the classifications, may be based on data points that are most relevance to the event, may be determined based on the data items relevance to a particular user, or may be determined in another similar manner. Once the data points of interest are identified, the data points may be provided to the requesting user. As an example, for an event related to product release data, the most relevant data point may be the release date identified within each of the articles. As a result, the release date may be prioritized in the summary that is provided to the user over other information differencing information for the particular event. Accordingly, using this example, the type of event (which may be determined from the information in the data objects) may be used to prioritize information that is provided in the summary to a user, however, it should be understood that other factors, including the identity of the user requesting the summary or the discrepancy difference between the classifications.

Figure 4:
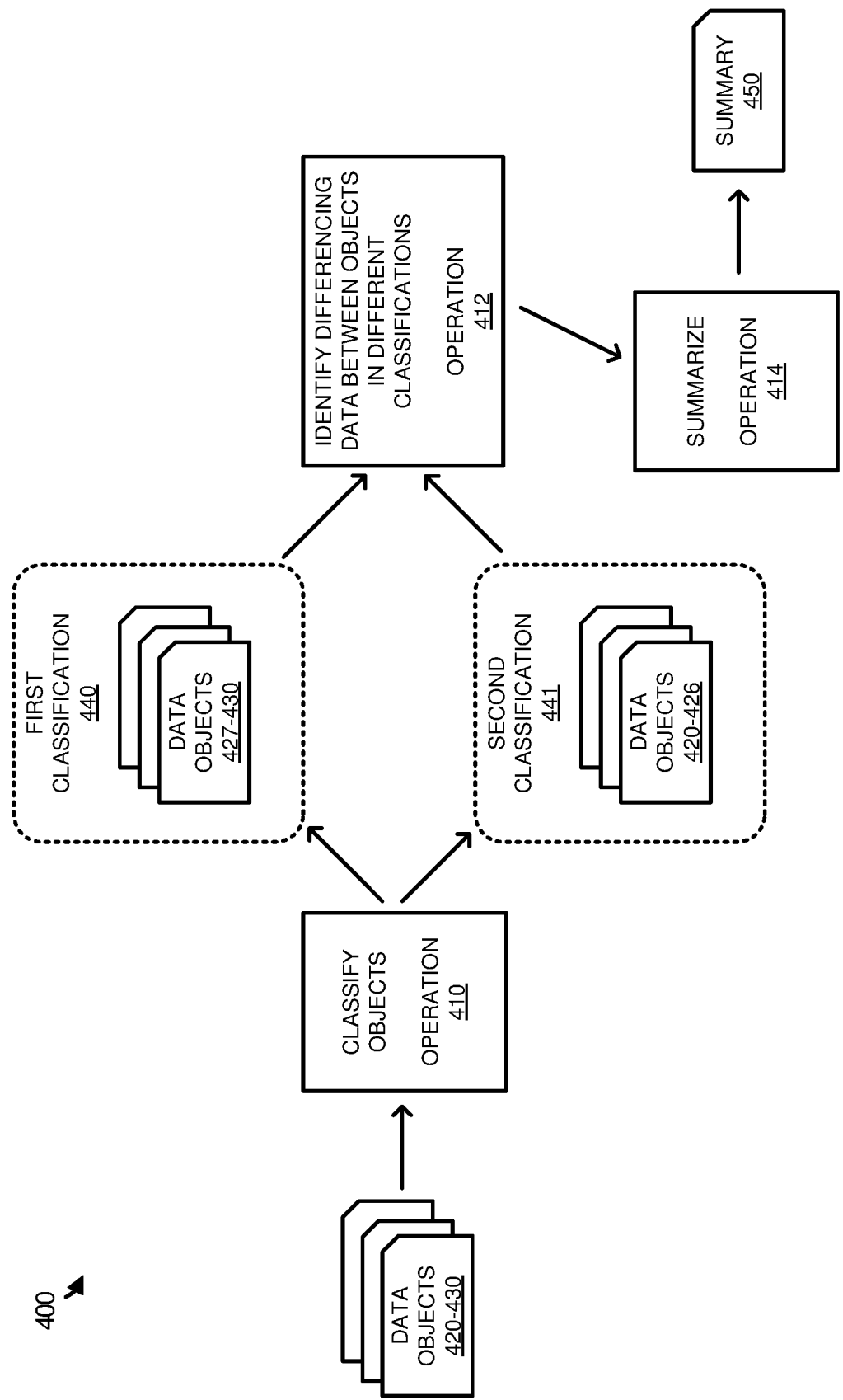
FIG. 4 illustrates an operational scenario of classifying data objects for an event according to an implementation.

FIG. 4 illustrates an operational scenario 400 of classifying data objects for an event according to an implementation. Operational scenario 400 provides an example of operations that may be provided by a summary service, such as summary service 110 of FIG. 1, and includes data objects 420-430, which correspond to data objects identified for an event, operations 410, 412, and 414, first classification 440, second classification 441, and summary 450. Although demonstrated with eleven data objects in the present implementation, it should be understood that any number of data objects may qualify for an event.

As depicted, once data objects 420-430 are identified that correspond to the event, the data objects may be classified, using operation 410, into first classification 440 or second classification 441 that correspond to a particular classification type. Classifications 440-441 may comprise classifications for geographic region, language, political philosophy, or some other similar classification type. In determining which classification corresponds to each of the data objects, the summary service may identify information about the data object, including the source of the data object, the content of the data object (e.g. the language, the author, the title, and the like), any metadata information about the object (e.g. the internet protocol address that the object is hosted on), or any other similar information about the object. Once the information is identified, the object may be classified into a classification of classifications 440-441. Here, based on the information for the data objects, data objects 427-430 are classified within first classification 440, while data objects 420-426 are classified as second classification 441.

Once the objects are classified, operation 412 is provided that identifies differencing data or information differences between objects in different classifications. In particular, content or data within each of the data objects may be compared to other data objects from other classifications. For example, data object 427 within first classification 440 may be compared to data objects 420-426 in second classification 441. In some implementations, the data objects may be compared individually to data objects in other classifications, however, it should be understood that the information may be aggregated to identify similar information across a particular classification prior to be compared to other classifications. For example, number values identified in first classification 440 may be averaged prior to being compared to similar values in second classification 441 (e.g. comparing quantity of persons involved in an event). This aggregation of values may be provided in accordance with numbers but may also be used in identifying persons of interest (e.g. similar persons across multiple data objects), word choice, opinions, or other similar information.

In comparing the data objects to identify information differences, the summary service may use various information in determining which data should be classified as relevant information differences to be provided to a user of the service. In particular, to identify differences of interest, the summary service may identify when numbers from classifications 440-441 differ by threshold amount, when language from different classifications meet differencing criteria (e.g. positive object descriptors "persons" versus "illegal aliens"), or some other similar method of identifying differencing data from the various classifications.

After the differencing data is determined for data objects in the different classifications, the summary service may summarize using operation 414 the information differences for a user of the summary service to generate summary 450. This summary may include a natural language summary of the differencing data, may include a list of the identified differencing data, may include images and/or graphs, or may include any other similar information, including combinations thereof. In some implementations, in providing the summary to a requesting user, the differencing data may be sorted using a variety of different methods. These methods may include the most frequently included values within data objects 420-430 (e.g. number of persons involved, numbers of locations, and the like), may be based on the preferences of the requesting user, may be based on the data that was shown to be most different between the classifications, or may be sorted in any other similar manner, including combinations thereof.

FIG. 5 illustrates a data structure 500 for managing classifications of data objects according to an implementation. Data structure 500 includes columns for data objects 510 and classification types 512-514. The column for data objects 510 includes objects 520-523, which correspond to data objects for a particular event. The column for classification types 512-514 includes classifications 530-532, 540-541, and classifications 550-551.

As described herein, when data objects are identified for an event, the data objects may be classified into various classifications. In the present example, each of the data objects that qualify for an event are classified into classification types 512-514, wherein the classification types may consist of a language classification, a geographical region classification, a political classification, or some other similar classification. Referring to an example of object 520, object 520 is classified as classification 530 for first classification type 512, classification 540 for second classification type 513, and classification 550 for third classification type 514. In classifying the data object, various information may be considered, including source information for the object (website, geographic location, and the like), the author of the data object, the date of the data object, any metadata information for the object, or any other similar information for the data object. For example, a data object from a news source may be classified based on any affiliations of the news source.

After the data objects are classified for each of the classifications of interest, then the data objects may be compared to identify differencing data or information differences between the data objects. Using an example of second classification type 513, objects 520 and 522 may be compared against objects 521 and 523. In comparing the data objects numerical values may be compared, units for the numerical values may be compared, or some other similar information extracted from the objects may be compared between the objects in different classifications, wherein similar data from various objects may be identified for comparison based on natural language processing. As an example, text from a first object may read "the new product will be launched April 7," while text for a second object may read "a release date is set for April 8 for the new product." The summary service may identify the relevant trait, in this example the release date, and compare the trait between the data objects. Once the differencing data is identified, a summary may be generated based on the differencing data as described herein, wherein the summary may provide information about the differences identified in the classifications.

Although demonstrated as each object qualifying for a classification in classification types 512-514, it should be understood that in some examples, a data object may not qualify for a classification (or may qualify for a NULL classification). For example, the summary service may attempt to identify objects that are in either English or Spanish, wherein any data object that does not qualify for either of the languages may not be classified or may be associated with a NULL classification. Thus, when data objects are compared for the classification, the data objects that are part of the NULL classification may not be factored in with the data objects that are written in English or Spanish.

Figure 6:
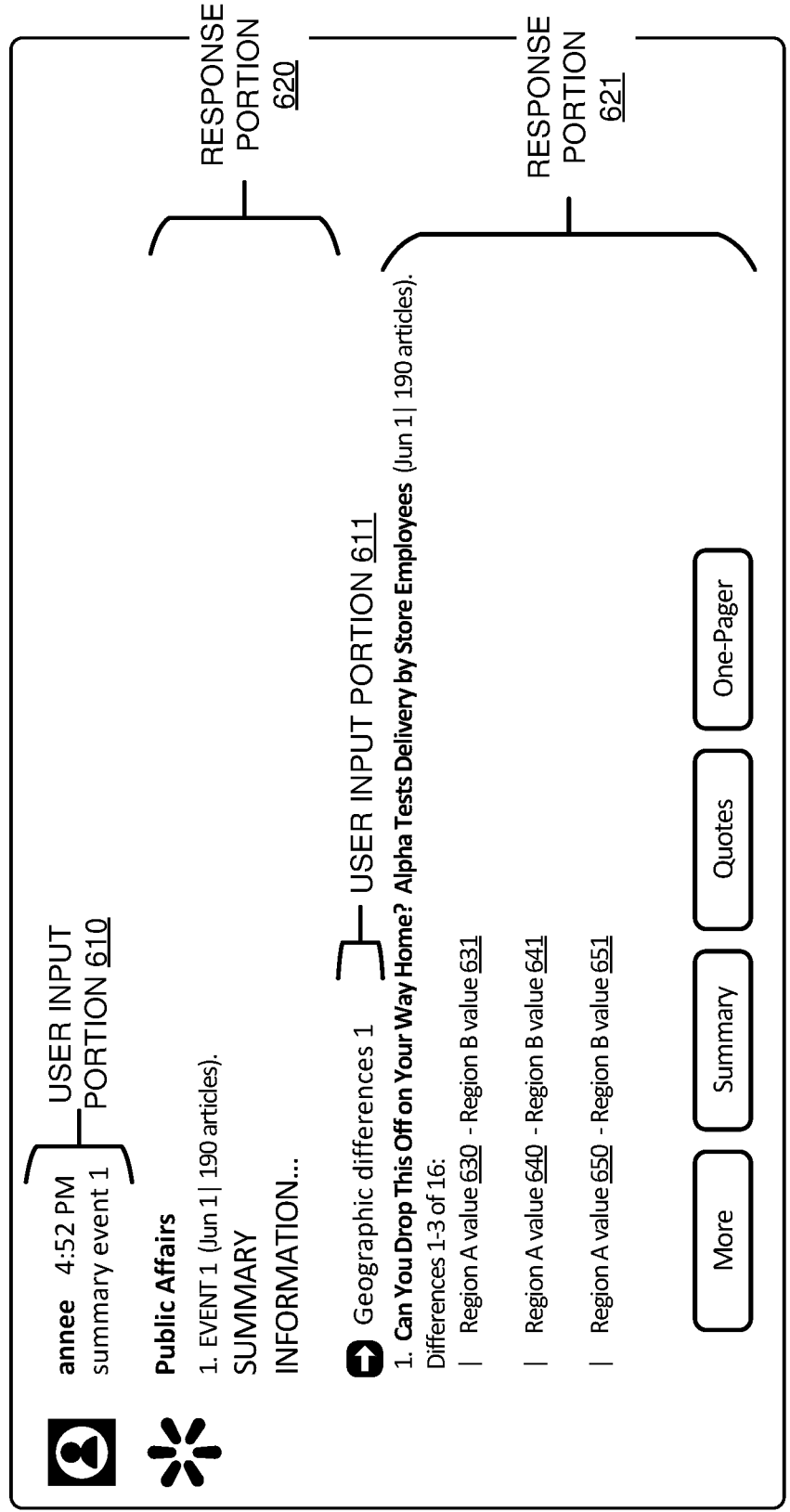
FIG. 6 illustrates a user interface for providing event summarization according to an implementation.

FIG. 6 illustrates a user interface 600 for providing event summarization according to an implementation. User interface 600 includes user input portions 610-611 and response portions 620-621.

As depicted, user interface 600 permits a user to submit a query about an event or events, and the summary service may generate a summary of the event. Here, user input portion 610 includes "summary event 1," wherein the user requests information related to a particular event. In response to the request, the summary service may generate a first summary of the event, which is generated based on the information from all of the data objects that are associated with the event. The summary may comprise text, images, graphs, or some other similar information to summarize an event. Once the first summary is provided using response portion 620, the user may require additional information about the event. Here, the user provides in user input portion 611 a request for geographic differences for the event, wherein the term "geographic differences" specifies the classifications of interest for the event.

In response to the request, the summary service may generate response portion 621, wherein the response portion includes information about the differences between various geographic regions. In the present implementation, the differences are presented as a list, wherein the value differences (illustrated as values 630-631, 640-641, and 650-651) correspond to differences between two different regions. To organize the list that is provided to the user, the summary service may use various factors to score each of the differences and prioritize various information differences over others. These factors may include identifying values that are most relevant to the event (e.g. if the event were the release date of a product, the date itself may be classified as the most relevant), identifying values with the largest discrepancy between classifications, identifying values that are most relevant to the user, or any other similar factor including combinations thereof. In some implementations, when the information is provided, the summary service may provide a defined quantity of differencing data, such as three items in a list. In other implementations, the amount of information provided in response portion 621 may be dynamic based on the types of differencing data that are identified, based on preferences of the end user requesting the summary, based on the type of event, or based on any other similar factor, including combinations thereof. Thus, while three differences are provided in response portion 621, it should be understood that any number of differencing entries may be provided to a requesting user.

Although demonstrated in the example of FIG. 6 as providing a list of the differencing data to a requesting user, it should be understood that the differencing data may be provided in a variety of different forms. The differencing information may be provided as prose in one or more paragraphs generated using a natural language generator, may be provided as an image, may be provided as a graph, or may be provided in any other form. For example, to demonstrate the differences in numerical values between different classifications, a graph may be generated that demonstrates the numerical value differences in the classifications. In some examples, in providing the graph, the summary service may require the user to expressly provide a request for the graph, however, it should be understood that the summary service may identify that a graph should be provided based on the types of data differences between the objects. Thus, if varying numerical values are identified between the classifications, then the summary service may determine that one or more graphs may be best to demonstrate the differences between the different classifications.

Figure 7:
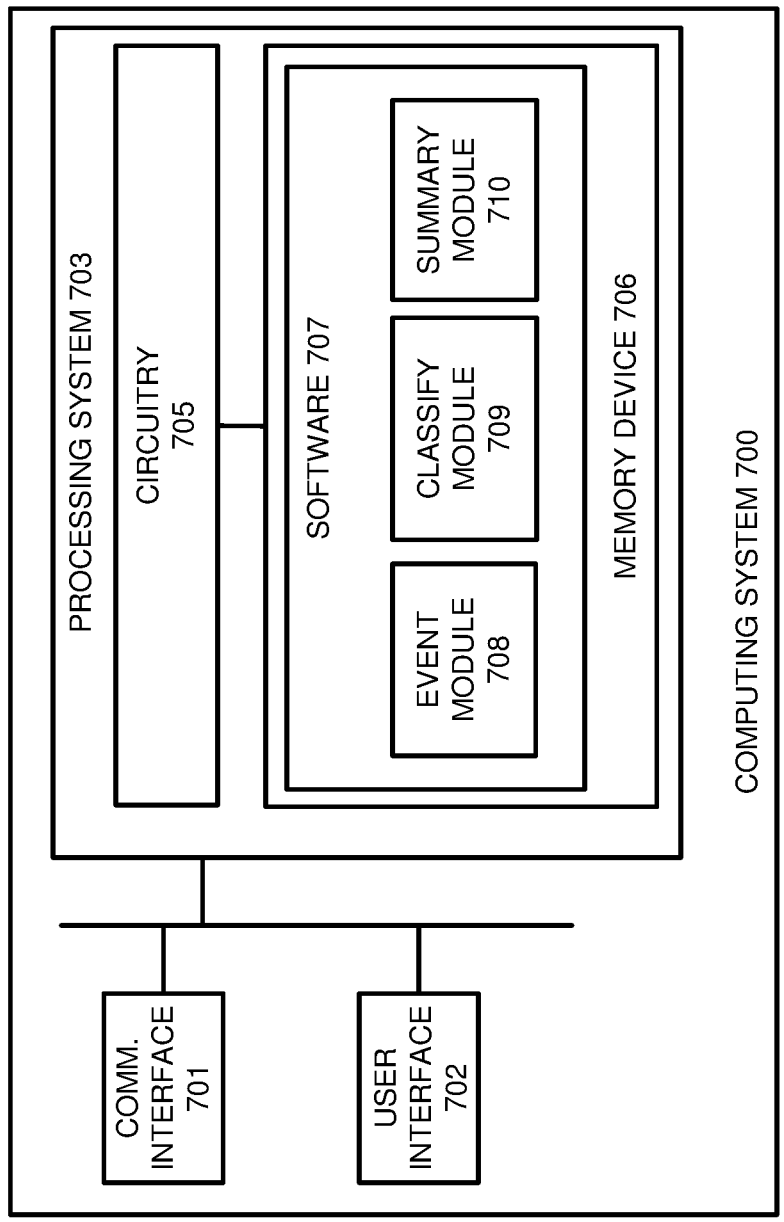
FIG. 7 illustrates a computing system for providing multi-source event summarization according to an implementation.

FIG. 7 illustrates a computing system 700 for providing multi-source event summarization according to an implementation. Computing system 700 is representative of any computing system or systems with which the various operational architectures, processes, scenarios, and sequences disclosed herein for an event summary service may be implemented. Computing system 700 is an example of summary service 110 and 310, although other examples may exist. Computing system 700 comprises communication interface 701, user interface 702, and processing system 703. Processing system 703 is linked to communication interface 701 and user interface 702. Processing system 703 includes processing circuitry 705 and memory device 706 that stores operating software 707. Computing system 700 may include other well-known components such as a battery and enclosure that are not shown for clarity.

Communication interface 701 comprises components that communicate over communication links, such as network cards, ports, radio frequency (RF), processing circuitry and software, or some other communication devices. Communication interface 701 may be configured to communicate over metallic, wireless, or optical links. Communication interface 701 may be configured to use Time Division Multiplex (TDM), Internet Protocol (IP), Ethernet, optical networking, wireless protocols, communication signaling, or some other communication format—including combinations thereof. In some implementations, communication interface 701 may be configured to communicate with information and supplemental resources to obtain objects for defining events. Communication interface 701 may further be configured to communicate with client or console devices of end users, wherein the users may request and receive summaries from computing system 700.

User interface 702 comprises components that interact with a user to receive user inputs and to present media and/or information. User interface 702 may include a speaker, microphone, buttons, lights, display screen, touch screen, touch pad, scroll wheel, communication port, or some other user input/output apparatus—including combinations thereof. User interface 702 may be omitted in some examples. In some implementations, user interface 702 may be used in obtaining user summary requests and providing the summary to the requesting user.

Processing circuitry 705 comprises microprocessor and other circuitry that retrieves and executes operating software 707 from memory device 706. Memory device 706 may include volatile and nonvolatile, removable and non-removable media implemented in any method or technology for storage of information, such as computer readable instructions, data structures, program modules, or other data. Memory device 706 may be implemented as a single storage device but may also be implemented across multiple storage devices or sub-systems. Memory device 706 may comprise additional elements, such as a controller to read operating software 707. Examples of storage media include random access memory, read only memory, magnetic disks, optical disks, and flash memory, as well as any combination or variation thereof, or any other type of storage media. In some implementations, the storage media may be a non-transitory storage media. In some instances, at least a portion of the storage media may be transitory. It should be understood that in no case is the storage media a propagated signal.

Processing circuitry 705 is typically mounted on a circuit board that may also hold memory device 706 and portions of communication interface 701 and user interface 702. Operating software 707 comprises computer programs, firmware, or some other form of machine-readable program instructions. Operating software 707 includes event module 708, classify module 709, and summary module 710, although any number of software modules may provide the same operation. Operating software 707 may further include an operating system, utilities, drivers, network interfaces, applications, or some other type of software. When executed by processing circuitry 705, operating software 707 directs processing system 703 to operate computing system 700 as described herein.

In one implementation, event module 708 directs processing system 703 to identify data objects that correspond to an event, wherein the data objects may comprise articles, images, graphs, videos, sound files, or some other similar data object that provides information for an event. Once the data objects are identified, classify module 709 directs processing system 703 to identify classifications of interest for the particular event. For example, a user may desire to classify each of the data objects based on the language associated with the object, the geographic source of the object, any affiliations of the object, or some other similar classification. After the classifications are defined, classify module 709 may determine, for each data object, whether the data object qualifies for a classification of interest and if it qualifies, classifies the data object as part of the classification of interest. As an example, classifications of interest may comprise United States originating data objects and Russian originating data objects. If a data object for the event originates in either of the regions, then the object may be classified accordingly. However, if a data object does not qualify for any of the classifications then the data object may not be classified for the classification type or may be classified in a NULL classification.

Once the data objects are classified, summary module 710 directs processing system 703 to determine information differences or differencing data between data objects in the classifications of interest. Returning to the example of the geographic regions of interest (e.g. United States and Russia), the data objects that qualify for each of the classifications may be compared against data objects that qualify for the other classification. This may include comparing each of the data objects (and associated content) individually or may comprise generating a summary of the content for an individual classification and use the summary to be compared with a summary for a different classification. The comparison between the data objects of the different classifications may include comparing quantitative values identified in the data objects, comparing geographic locations identified in the data objects, comparing opinion information in the data objects, comparing unit information for the numerical values (e.g. "aliens" instead of "refugees"), or may compare any other similar information, including combinations thereof.

In some implementations, in comparing the content from the various data objects, summary module 710 may be configured to determine when a particular differencing information (e.g. a numerical value) meets criteria to be provided to a user. For example, different numerical values provided between classifications may require that the different values meet a difference criteria, or value difference, before they are considered relevant for the user. Similarly, criteria may also be used to ensure that a defined quantity of data objects in a classification share a data item before the data item is considered relevant for comparison with another classification. Although these are some examples of the criteria that may be used in comparing data objects between classifications, it should be understood that other criteria may be used, including historical accuracy of a data object source, the relevancy of the data to the event, or some other similar factor.

Once information differences are identified, the information differences may be used in generating a summary by summary module 710 for an end user of the summary service. This summary may comprise a list of the information differences between classifications, a text-based summary of the differences generated using natural language, a graph, or some other similar summary. In some implementations, in presenting the data to the user the data may be presented based on its relevance to the event (e.g. a release date for a product may be prioritized over other information differences), preferences of the end user (differences in opinion prioritized over quantitative data), or some other similar method of prioritizing information that is provided to the user. In at least one example, in determining what differencing data is provided to the user and the priority for the data, a score may be generated for the various data points (e.g. locations, values, and the like) and the score may be used to determine which data meets criteria to be provided to a requesting user.

Returning to the elements of FIG. 1, information sources 122 and supplemental sources 124 may comprise websites and/or databases capable of providing news stories, social media posts, blog posts, images, and other similar types of objects to summary service 110. Information sources 122 and supplemental sources 124 may each comprise one or more communication interfaces and network interfaces, processing systems, computer systems, microprocessors, storage systems, storage media, or some other processing devices or software systems. Information sources 122 and supplemental sources 124 may each comprise one or more serving computing systems, desktop computing systems, or some other similar computing system.

Summary service 110 comprise communication interfaces and network interfaces, processing systems, computer systems, microprocessors, storage systems, storage media, or some other processing devices or software systems, and can be distributed among multiple devices. Summary service 110 may include software such as an operating system, logs, databases, utilities, drivers, networking software, and other software stored on a computer-readable medium.

Communication between the summary service 110 and sources 122 and 124 may use metal, glass, optical, air, space, or some other material as the transport media. Communication between the summary service 110 and sources 122 and 124 may use various communication protocols, such as Time Division Multiplex (TDM), asynchronous transfer mode (ATM), Internet Protocol (IP), Ethernet, synchronous optical networking (SONET), hybrid fiber-coax (HFC), circuit-switched, communication signaling, wireless communications, or some other communication format, including combinations, improvements, or variations thereof. Communication between the summary service 110 and sources 122 and 124 may be a direct link or can include intermediate networks, systems, or devices, and can include a logical network link transported over multiple physical links.

The included descriptions and figures depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A method of operating a summary service to provide event summarization, the method comprising:
  identifying data objects that qualify for an event from a plurality of data objects obtained from a plurality of information sources, wherein the event comprises a political event, a popular culture event, a legal event or proceeding, or a military event, and wherein the data objects comprise news stories, blog posts, documents, social media posts, videos, and/or audio files;
  identifying two or more classifications of interest for the data objects that qualify for the event, wherein the two or more classifications of interest comprises two or more political philosophies;
  for each data object in the data objects that qualify for the event, determining whether the data object qualifies for a classification of interest of the two or more classifications of interest;
  when the data object qualifies for a classification of interest of the two or more classifications of interest, classifying the data object as part of the classification of interest;
  determining information differences between data objects in different classifications of the two or more classifications of interest; and
  generating a summary based on the information differences.

2. The method of claim 1, wherein the information sources comprise webpages and/or feeds.

3. The method of claim 1, wherein the two or more classifications of interest comprise two or more geographic regions.

4. The method of claim 1, wherein the two or more classifications of interest comprise two or more languages.

5. The method of claim 1 further comprising receiving a request for the summary from an end user, and wherein generating the summary based on the information differences comprises generating the summary based on the information differences and summary preferences of the end user.

6. The method of claim 5, wherein the summary preferences of the end user comprise learned preferences identified from previous summary requests and responses for the end user.

7. The method of claim 1, wherein determining information differences between data objects in different classifications of the two or more classifications comprises determining numerical value differences for values identified in data objects in different classifications of the two or more classifications.

8. A computing apparatus comprising:
  one or more non-transitory computer readable storage media;
  a processing system operatively coupled to the one or more non-transitory computer readable storage media; and
  program instructions stored on the one or more non-transitory computer readable storage media to provide event summarization that, when read and executed by the processing system, direct the processing system to at least:
    identify data objects that qualify for an event from a plurality of data objects obtained from a plurality of information sources, wherein the event comprises a political event, a popular culture event, a legal event or proceeding, or a military event, and wherein the data objects comprise news stories, blog posts, documents, social media posts, videos, and/or audio files;
    identify two or more classifications of interest for the data objects that qualify for the event, wherein the two or more classifications of interest comprises two or more political philosophies;
    for each data object in the data objects that qualify for the event, determine whether the data object qualifies for a classification of interest of the two or more classifications of interest;
    when the data object qualifies for a classification of interest of the two or more classifications of interest, classify the data object as part of the classification of interest;
    determine information differences between data objects in different classifications of the two or more classifications of interest; and
    generate a summary based on the information differences.

9. The computer apparatus of claim 8, wherein the information sources comprise webpages and/or feeds.

10. The computer apparatus of claim 8, wherein the two or more classifications of interest comprise two or more geographic regions.

11. The computer apparatus of claim 8, wherein the two or more classifications of interest comprise two or more languages.

12. The computer apparatus of claim 8, wherein the program instructions further direct the processing system to receive a request for the summary from an end user, and wherein generating the summary based on the information differences comprises generating the summary based on the information differences and summary preferences of the end user.

13. The computer apparatus of claim 11, wherein the summary preferences of the end user comprise learned preferences identified from previous summary requests and responses for the end user.

14. The computer apparatus of claim 8, wherein determining information differences between data objects in different classifications of the two or more classifications comprises determining numerical value differences for values identified in data objects in different classifications of the two or more classifications.

15. The computer apparatus of claim 8, wherein determining information differences between data objects in different classifications of the two or more classifications comprises:
  for each classification, generating a summary of data values from data objects that classify for the classification; and
  determining the information differences between the summaries for each of the classifications.

16. The computer apparatus of claim 8, wherein generating the summary based on the information differences comprises generating a text summary or graph-based summary based on the information differences.

17. A method of operating a summary service to provide a summary of an event, the method comprising:

for each data object in a plurality of data objects that provide information for the event, determine whether the data object qualifies for a classification of interest of two or more classifications of interest, wherein the two or more classifications of interest comprises two or more political philosophies, and wherein the data objects comprise news stories, blog posts, documents, social media posts, videos, and/or audio files;

when the data object qualifies for a classification of interest of the two or more classifications of interest, classifying the data object as part of the classification of interest;

determining information differences between data objects in different classifications of the two or more classifications of interest;

scoring each information difference of the information differences based at least on a relevance of the information difference to an event type for the event, wherein the event type comprises a political event, a popular culture event, a legal event or proceeding, or a military event; and generating a summary based on the scores for each information difference of the information differences.

18. The method of claim 17, wherein generating the summary based on the scores for each information difference of the information differences comprises generating the summary based on the scores for each information difference of the information differences, wherein each information difference is prioritized in the summary based on the scores.

* * * * *